No. 824,119. PATENTED JUNE 26, 1906.
E. C. HOWLAND.
COOKING UTENSIL.
APPLICATION FILED MAR. 16, 1905.

Witnesses:
Chas. F. Bassett
Wm. B. Moore

Inventor:
Edward C. Howland
By Frederick Benjamin
Atty.

UNITED STATES PATENT OFFICE.

EDWARD C. HOWLAND, OF NEW MILFORD, CONNECTICUT.

COOKING UTENSIL.

No. 824,119.            Specification of Letters Patent.            Patented June 26, 1906.

Application filed March 16, 1905. Serial No. 250,341.

*To all whom it may concern:*

Be it known that I, EDWARD C. HOWLAND, a citizen of the United States, residing at New Milford, in the county of Litchfield and State of Connecticut, have invented certain new and useful Improvements in Cooking Utensils, of which the following is a specification.

This invention relates generally to improvements in cooking utensils, and especially to an attachment intended for use in connection with kettles, saucepans, or like utensils used for boiling or cooking fruits, vegetables, and meats.

The especial object of the improvements is to provide means whereby should the water be evaporated from the utensil holding the products to be cooked the latter will be protected from burning by contact with the bottom of the vessel.

In carrying out the above object I provide the attachment shown in a preferred form in the accompanying drawings, which form a part of this application, in which—

Figure 1:
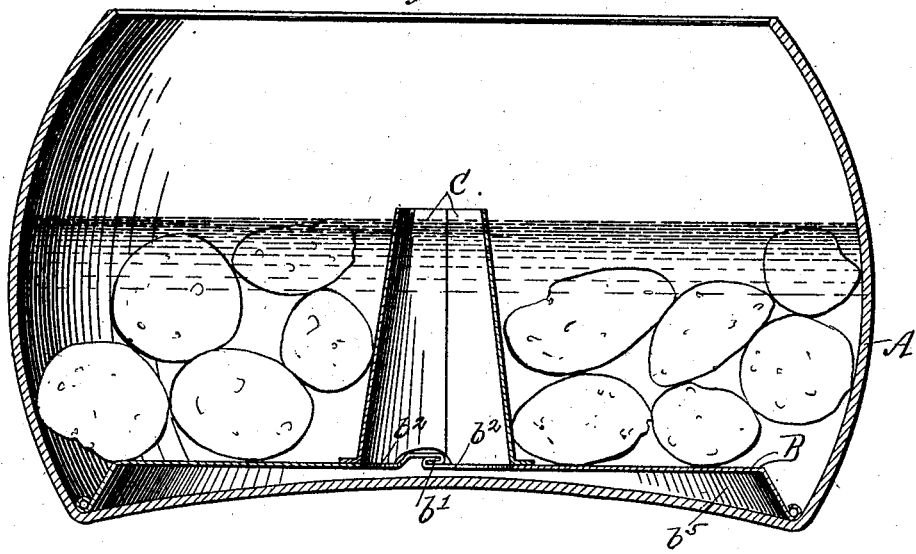
Figure 2:
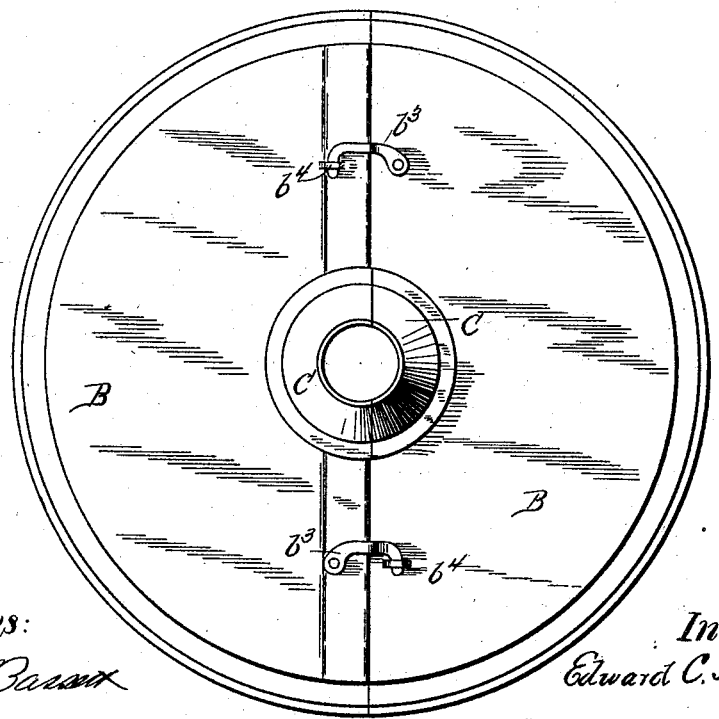

Figure 1 is a view in section, showing the kettle with my attachment inserted therein, and Fig. 2 is a top plan view of my invention alone.

Referring to the drawings in detail, A represents a kettle or saucepan of common form and containing water in which potatoes have been placed for boiling. Resting on the bottom of the kettle is the base B of my device, which is shown formed in two semicircular sections having their opposing straight edges bent over and interlocked, as shown at $b'$. Each of these sections has a semicircular opening in its center, as at $b^2$, and is provided with pivoted hooks $b^3$, which are adapted to engage loops, as $b^4$, which are formed by cutting and striking up portions of said sections. Suitably secured around the openings $b^2$ in said base-plates are semitubular sections C, the walls of which taper inwardly at their upper ends. The straight edges of these sections C register when the parts are assembled or, if desired, may overlap each other. The element C may be permanently secured to the base B or be detachably secured, as may be desired. The object in making the elements B and C in two sections is to facilitate their introduction into the mouth or opening of the vessel where the mouth or opening is of less diameter than the body of the vessel, as it is important to have the base occupy or cover the entire bottom of the vessel. Where the mouth of the vessel is of the same cross-diameter as the bottom, it will not be necessary to make the elements B and C in sections, and I reserve the right therefore to make them in one piece each and secure them together in any convenient and well-known manner. The base B is formed with a downwardly-extending annular flange $b^5$, thus raising it above the bottom of the vessel and leaving a chamber between the latter and the base.

Constructed and arranged as described, my invention will provide in the first instance for a circulation of the water in the vessel when boiling, which will facilitate the cooking operations, and should the water be entirely evaporated the base portion B by keeping the vegetables &c., from coming in direct contact with the dry bottom of the vessel will protect same from scorching or burning, it being well known that the interposition of a chamber between the heat and the articles cooking will serve as a non-conductor, so that considerable less heat will reach the articles than would occur if the latter were directly in contact with the heated surface.

I am aware that patents have been issued on bake-pans involving an annular rim constituting the sides of the pan, a removable bottom, and a conical detachable center; but my invention does not apply to bake-pans, is not adapted to be so used, and has no annular sides, and I do not claim such construction; but

What I claim is—

1. An attachment for cooking utensils consisting of an imperforate base formed in sections detachably connected together, said sections formed with peripheral downwardly-extending flanges and a tubular extension formed in sections connected with the respective sections of the base-plate said tube open at both ends.

2. An attachment for cooking utensils, consisting of a base formed in two semicircular sections having interlocking edges and detachably connected together, said base-sections having downwardly-extending peripheral flanges, a tubular extension connected with the center of said base and open at the top and bottom.

In testimony whereof I affix my signature in presence of two witnesses.

EDWARD C. HOWLAND.

Witnesses:
   J. H. MOREHOUSE,
   GEORGE S. LANE.